Dec. 3, 1968 R. W. CROWE 3,414,301

SHOE BRACE CONSTRUCTION

Filed June 22, 1966

INVENTOR.
Robert W. Crowe
BY Dawson, Tilton, Fallon,
Lungmus, and Alexander
ATTORNEYS United States Patent Office 3,414,301
Patented Dec. 3, 1968

3,414,301
SHOE BRACE CONSTRUCTION
Robert W. Crowe, San Gabriel, Calif., assignor to Dentin Manufacturing Company, Bellwood, Ill., a corporation of Illinois
Filed June 22, 1966, Ser. No. 559,631
4 Claims. (Cl. 287—54)

ABSTRACT OF THE DISCLOSURE

In tubular frame construction, frame tubes are tightly joined under tension by a connector tube having at its end a spring sleeve, the inner face of the sleeve being slightly less in radius that the radius of the frame tube to which it is joined. Connector means, such as bolts and screws, force the spring sleeve to expand so as to engage the tubular frame and the sleeve grips under spring tension the frame tube. The connector tube is provided with a gusset web which maintains the connector tube against twisting force, and the draw connector means extend through the sleeve in line with the gusset webs.

---

In a tubular frame structure, a cross tube or connector tube is provided at its end with a spring sleeve having an arc of slightly less radius than that of the frame tube exterior. By means of draw connector means, such as bolts and nuts, the spring sleeve is expanded so as to engage the frame tube and to grip the same under spring tension. Twisting force is resisted by a gusset web which extends between the connector tube and the sleeve. The combination provides great strength and rigidity and resists torsional stresses placed upon the frame structure.

This invention relates to shoe brace construction, and more particularly to a tubular frame structure in which frame tubes are joined by the use of connector sleeves or shoes.

In tubular frame structures in which a number of tubes are connected to form tables, seats, and combination structures of many types, the problem is to provide means for securing a sturdy structure while using as little metal or material as possible. It is, of course, easy to provide a rigid structure by using a large number of parts, but to bring about an extremely sturdy structure with a minimum number of parts has long presented a problem.

I have discovered that by providing a connector tube at its end with a brace shoe or sleeve of spring metal, the sleeve having an arcuate face of less radius than that of the frame tube to which it is to be connected and by connecting the sleeve to the frame tube by draw connector means which expand the shoe to hold it in gripping contact under tension, rigid frame combinations can be made while employing a minimum of parts.

A primary object, therefore, is to provide in tubular structures, brace connectors which unite tubular parts in a rigid structure. A further object is to provide in such tubular structure, tube and sleeve structures which may be so united as to connect parts rigidly so as to resist torsion or twisting. A still further object is to provide table and similar structures in which effective support is accomplished through the use of sleeve and gusset means. Other specific objects and advantages will appear as the specification proceeds.

Figure 1:
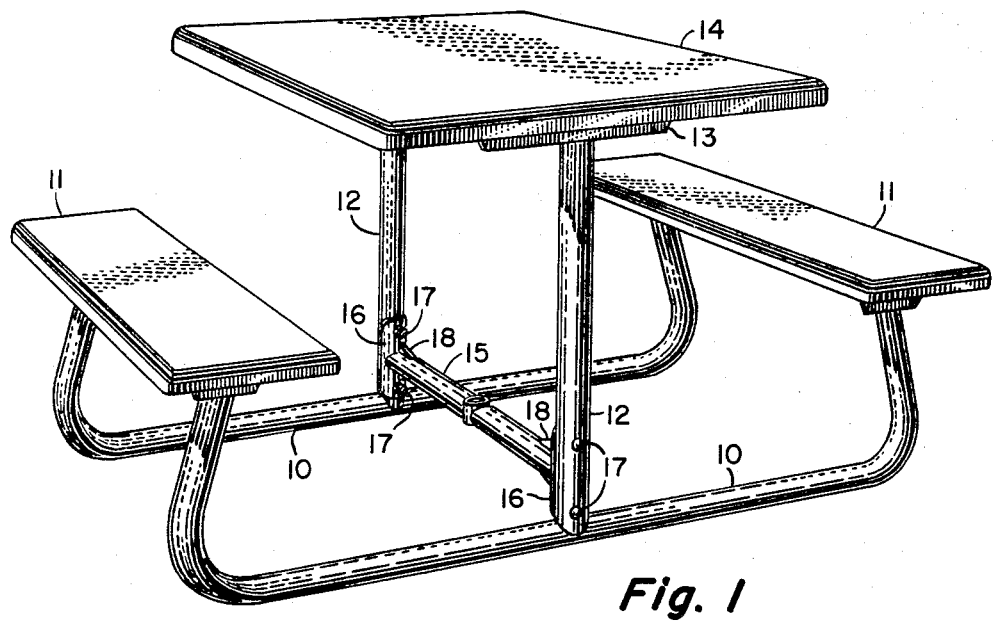
Figure 2:
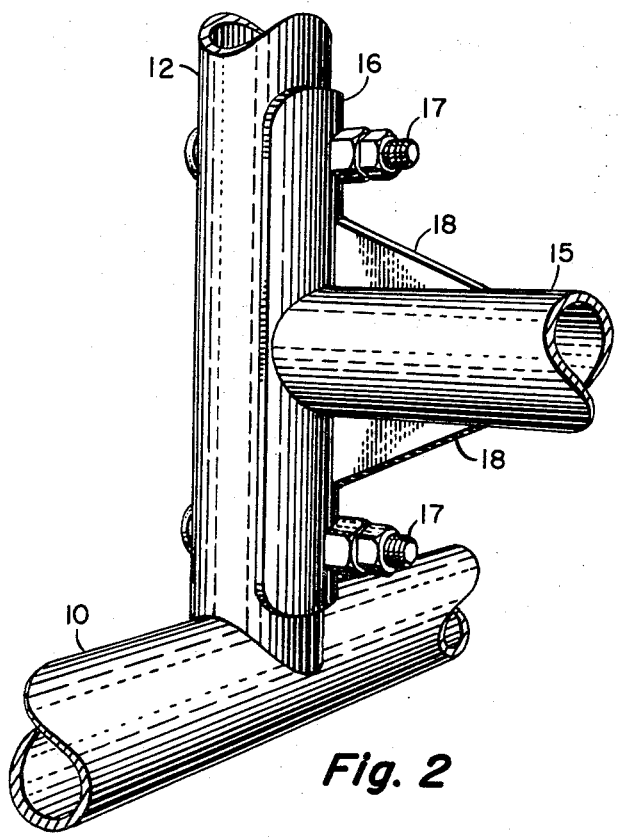

The invention is shown, in an illustrative embodiment, by the accompanying drawing, in which:

FIGURE 1 is a perspective view of a table and seat combination equipped with brace shoe or sleeve means embodying my invention; and FIG. 2, an enlarged broken perspective view of the connecting structure shown in FIG. 1.

In the illustration given, 10 designates a tubular base having upwardly-turned end portions on which are supported seats 11. Welded or otherwise secured to the central portion of the base members 10 are frame tubes or risers 12 which extend upwardly and are anchored by welding or other means to a metal plate 13 which in turn is secured to and carries a table 14. The seats 11 and table 14 may be formed of any suitable material, such as plastic, metal, glass fiber and resin board material, etc.

To brace and unite the frame tube members 12, I provide a cross tube 15 which is equipped at its ends with brace sleeves or shoes 16. Each sleeve 16 is formed of spring metal having an arcuate face conforming generally to the arc of the frame member 12, but before being attached to the member 12 having a radius slightly les than that of the exterior of frame tube 12. Draw bolts 17 are employed for drawing the spring sleeve 16 toward the frame tube 12 to spread or expand the tube and to hold it under tension against the member 12, as shown best in FIG. 2. To accomplish this, a threaded nut is drawn about the threaded end of bolt 17, and preferably a second lock nut is employed for maintaining the set position.

By way of example, the frame tube 12 may have a diameter of 1⅝ inches while the diameter of the tube of which sleeve 16 is a segment may be 1½ inches prior to the connection of the parts. After the sleeve 16 is placed under compression, its arc substantially approaches that of the arc of tube 12.

The cross tube or connector tube 15 may be united to the central portion of the sleeve 16 by welding or by any suitable means. I prefer to increase the bonds between the tube 15 and sleeve 16 by employing gussets or webs 18, as shown best in FIG. 2.

In operation, the table and seat combination may be constructed by securing the seat members 11 upon the upturned ends of the base tubes 10. The frame tubes 12 may then be secured by welding, flange and bolt construction, or by any other suitable means upon the base members 10. The risers or frame tubes 12 may be secured to the support plate 13 and the table 14 mounted thereon.

To provide a rigid structure, the cross tube 15, having at each end a spring sleeve 16 with an arc of slightly less radius than that of the frame tube 12 exterior, is placed in contact with the tubes 12 and the bolts 17 secured in position, as shown in FIG. 1. The nuts of the bolt structure are rotated to draw the spring sleeve member 16 toward the larger arc tube 12 to expand or spread the sleeve, and the parts are then locked in such tensioned position. With this structure, it is found that great rigidity is given to the structure. Even if one sits on a corner portion of the table 14, the twisting force is resisted effectively by the sleeve connections. While the sleeve and gusset connector means occupy very little space in the tubular structure, they provide great strength and rigidity while also resisting torsion stresses placed upon the table or other support.

While in the foregoing specification, I have set out a specific structure in considerable detail for the purpose of illustrating an embodiment of my invention, it will be understood that such details may be varied widely by those skilled in the art without departing from the spirit of my invention.

I claim:

1. In a tubular frame structure, a frame tube member, a connector tube member provided at its end with an elongated shoe sleeve of spring metal, said sleeve having, prior to attachment to the frame tube, an arcuate inner face of slightly less radius than the radius of said frame tube exterior, and draw connector means carried by one of said members and extending through the other of said members for spreading said spring sleeve against said frame tube to increase the radius of said sleeve so as to engage said frame tube whereby said sleeve grips said frame tube under tension and is held against said frame tube by said spring tension and said draw connector means.

2. The structure of claim 1 in which said connector tube has an end fixed to a central portion of said sleeve and gusset webs extend between said connector tube and longitudinal portions of said tube.

3. The structure of claim 2 in which said draw connector means are positioned outwardly and in line with said gusset webs.

4. The structure of claim 1 in which said draw connector means extend through said frame tube and said sleeve.

References Cited

UNITED STATES PATENTS

| 889,223 | 6/1908 | Graham | 287—54 |
| 1,376,895 | 5/1921 | Murnane | 287—54 |
| 3,193,060 | 7/1965 | Park | 52—695 |

FOREIGN PATENTS

| 528,319 | 5/1954 | Belgium. |
| 538,103 | 5/1955 | Belgium. |
| 1,253,680 | 1/1961 | France. |

JAMES T. McCALL, *Primary Examiner.*